United States Patent
Acharya

(10) Patent No.: US 6,697,887 B1
(45) Date of Patent: Feb. 24, 2004

(54) SYSTEM AND METHOD FOR INTERFACING BETWEEN A MEDIA ACCESS CONTROLLER AND A NUMBER OF PHYSICAL LAYER DEVICES USING DATA ADDRESSING

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 519 days.

(21) Appl. No.: 09/594,232

(22) Filed: Jun. 14, 2000

(51) Int. Cl.[7] .................................................. G06F 3/00
(52) U.S. Cl. ..................... 710/38; 710/64; 710/129; 709/250; 370/445
(58) Field of Search ..................... 710/7, 9, 31, 36, 710/37, 38, 43, 64, 129; 370/236, 445, 446, 241, 406, 463; 709/250

(56) References Cited

U.S. PATENT DOCUMENTS

| | | | | |
|---|---|---|---|---|
| 5,809,026 A | * | 9/1998 | Wong et al. ................. | 370/445 |
| 5,943,341 A | * | 8/1999 | Gazda, Jr. .................... | 370/452 |
| 5,948,080 A | * | 9/1999 | Baker .......................... | 710/37 |
| 5,995,514 A | * | 11/1999 | Lo .............................. | 370/463 |
| 6,075,773 A | * | 6/2000 | Clark et al. ................. | 370/241 |
| 6,076,115 A | * | 6/2000 | Sambamurthy et al. ...... | 709/250 |
| 6,094,439 A | * | 7/2000 | Krishna et al. .............. | 370/445 |
| 6,169,742 B1 | * | 1/2001 | Chow et al. ................. | 370/402 |
| 6,195,334 B1 | * | 2/2001 | Kadambi et al. ............ | 370/263 |
| 6,222,852 B1 | * | 4/2001 | Gandy ......................... | 370/463 |
| 6,275,501 B1 | * | 8/2001 | Lucas et al. ................. | 370/463 |
| 6,487,214 B1 | * | 11/2002 | Bachar ........................ | 370/445 |
| 6,594,283 B1 | * | 7/2003 | Horspool et al. ............ | 370/501 |

OTHER PUBLICATIONS

IEEE Std 802.3u–1995, American National Standard, IEEE Standards for Local and Metropolitan Area Networks, pp. 1–16, 27–80.

* cited by examiner

*Primary Examiner*—Rehana Perveen
*Assistant Examiner*—Rijue Mai
(74) *Attorney, Agent, or Firm*—Renner, Otto, Boisselle & Sklar

(57) ABSTRACT

A system and method are provided in a media access controller and in a physical layer device for communicating between the media access controller to a number of physical layer devices. In one embodiment, the system in the media access controller comprises a common bus port for electrical coupling to a common bus that is electrically coupled to the physical layer devices, the common bus port including a parallel data port and an enable port. The system also includes a logical circuit to transmit a data block to a respective one of the physical layer devices via the parallel data port. The logical circuit specifically proceeds the transmission of the data block with the transmission of an address block that indicates the particular physical layer device to which the data block is to be transmitted. In addition, the system in each of the physical layer devices facilitates receiving data from the media access controller.

30 Claims, 4 Drawing Sheets

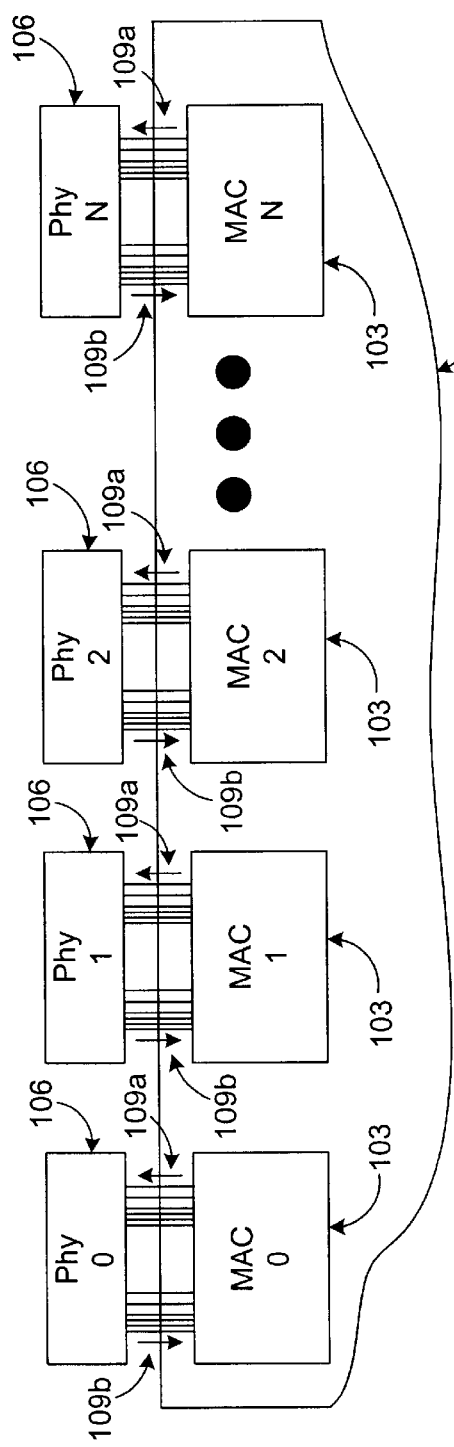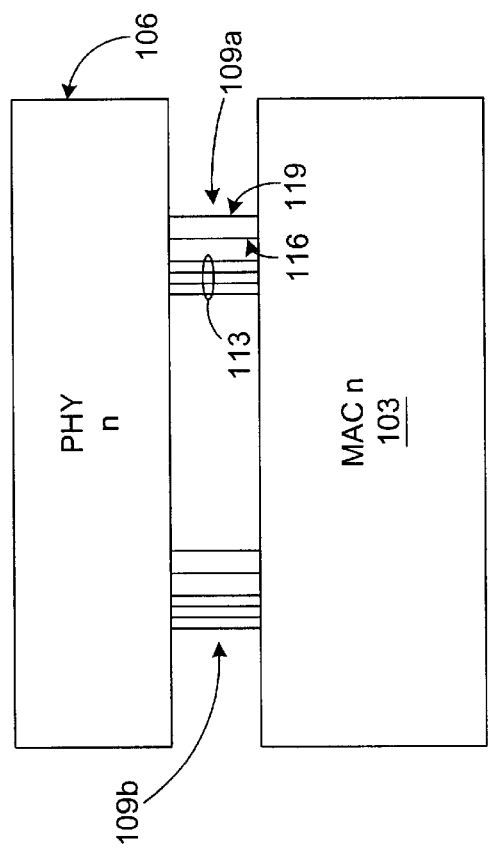

SYSTEM AND METHOD FOR INTERFACING BETWEEN A MEDIA ACCESS CONTROLLER AND A NUMBER OF PHYSICAL LAYER DEVICES USING DATA ADDRESSING

TECHNICAL FIELD

The present invention is generally related to data communications and, more particularly, is related to a system and method for interfacing between a single media access controller to a number of physical layer devices.

BACKGROUND OF THE INVENTION

In the field of data communications, there are many types of networks that facilitate the transfer of data from one location to another. Some exemplary standards include Ethernet, X.25, Frame Relay, and Asynchronous Transfer Mode. Generally these standards are available from standards bodies such as the Institute of Electrical and Electronics Engineers (IEEE) and other organizations. The standards generally describe how the data is to be packaged and then transported across the particular network and also provide for error checking and other aspects of data transmission as they relate to the particular standard in question.

With particular focus to Ethernet networks, the standards that guide the creation and operation thereof include the IEEE Std 802.3-1995, the entire text of which is incorporated herein by reference. The IEEE Std 802.3-1995 generally discusses Ethernet networks as they relate to the Data Link and Physical layers of the International Organization for Standardization Open Systems Interconnection (ISO/OSI) Reference Model which is well known by those skilled in the art.

In the Physical and Data Link layers, the IEEE Std 802.3-1995 particularly discusses the specifications and operation of the Media Access Controller (MAC) of the Data Link layer and the physical layer devices (PHYs) of the Physical layer. Also, the particular interconnection between the media access controllers and the physical layer devices is discussed, referred to as a Media Independent Interface (MII). As discussed in IEEE Std 802.3-1995, the MII may assume one of three following forms, including an integrated circuit to integrated circuit interface with traces on a printed circuit board, a motherboard to daughterboard interface between two or more circuit boards, or an interface between two printed circuit assemblies that are attached with a length of cable and an appropriate connector.

The data transfer accomplished with the MII as specified by IEEE Std 802.3-1995 provides for bi-directional data transfer. In each direction, the MII specifies a four bit bundle of conductors to transfer four bits of data or a single nibble in a four bit parallel data transfer. Also, the MII includes a transmit enable (TX_EN) conductor in each direction that provides a pathway for a TX_EN signal indicating that the nibbles are being presented on the MII for transmission. The IEEE Std 802.3-1995 also specifies that a single MII is to be employed between a media access controller and a respective physical layer device with which the media access controller communicates. Unfortunately, this requires a number of input and output pins to accommodate the MII interface between each media access controller and its associated physical layer device given that a single chip includes a number of media access controllers. This results in a significant number of pins that places a limit on the number of media access controllers within a specific integrated circuit due to size limitations as well as resulting in real estate problems on the integrated circuit itself.

SUMMARY OF THE INVENTION

In light of the foregoing, the present invention provides for a system and method in a media access controller for communicating to a number of physical layer devices. In one embodiment, the system comprises a common bus port for electrical coupling to a common bus that is electrically coupled to the physical layer devices, the common bus port including a parallel data port and an enable port. The system also includes a logical circuit to selectively transmit a data block to a respective one of the physical layer devices via the parallel data port. The logical circuit specifically precedes the transmission of the data block with the transmission of an address block that indicates the particular physical layer device to which the data block is to be transmitted.

In another embodiment, the present invention provides for a method for communicating to a number of physical layer devices via a media access controller. Broadly stated, the present method comprises the steps of: providing a common bus port in the media access controller for electrical coupling to a common bus that is electrically coupled to the number of physical layer devices, the common bus port including a parallel data port and an enable port, and transmitting a data block to a respective one of the physical layer devices via the parallel data port.

In still another embodiment, the present invention provides for a system and method in a physical layer device to receive data from the media access controller. In this regard, the system comprises a common bus port for electrical coupling to a common bus that is electrically coupled to a number of physical layer devices, the common bus port comprising a parallel data port and an enable port. The system also includes a logical circuit to maintain an address designation associated with the physical layer device and a logical circuit to receive an address block via the parallel data port. Finally, the system in the physical layer device comprises a logical circuit to receive a data block associated with the address block via the parallel data port. The physical layer device employs these elements to receive a data block that is associated with the received address block when the address block is equal to the address designation of the particular physical layer device.

The present invention can also be viewed as providing a method for receiving data in a physical layer device from a media access controller. This method can be broadly summarized by the following steps: providing for a common bus port in the physical layer device, the common bus port being adapted for electrical coupling to a common bus that is electrically coupled to a number of physical layer devices, the common bus port comprising a parallel data port and an enable port; maintaining an address designation associated with the physical layer device; receiving an address block from the media access controller via the parallel data port; and, receiving a data block associated with the address block from the media access controller via the parallel data port.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a block diagram of an integrated switching circuit that comprises a number of media access controllers according to the prior art;

FIG. 2 is a block diagram of a single media access controller with its associated physical layer device according to the prior art;

DETAILED DESCRIPTION OF THE INVENTION

Figure 3:
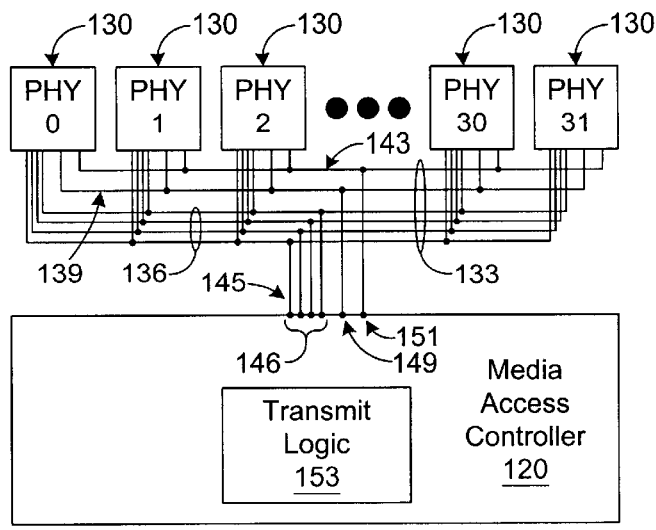
FIG. 3 is a block diagram of a media access controller according to an embodiment of the present invention.

With reference to FIG. 1, shown is an integrated switching circuit 100 according to the prior art. The integrated switching circuit 100 includes a number of media access controllers (MACs) 103, each of the media access controllers 103 being in electrical communication with a physical layer device 106. Communication between the respective physical layer devices 106 and the media access controllers 103 is established across a number of conductors 109a and 109b that make up the physical portion of a media independent interface as set forth by the standards in the IEEE Std 802.3-1995. According to IEEE Std 802.3-1995, there are a number of conductors 109a and 109b between each of the media access controllers 103 and their respective physical layer devices 106 that are employed to establish bi-directional data communication, error indication, and other aspects of the media independent interface.

Turning then to FIG. 2, shown is a close up view of a media access controller 103 and its associated physical layer device 106 according to the prior art. Note that the conductors 109a that are used for communication from the media access controller 103 to the physical layer device 106 include four data lines 113, a transmit enable line 116, and a clock line 119. The conductors 109b are used for communication from the physical layer device 106 to the media access controller 103. It is understood that there are other conductors 109a between the media access controller 103 and each physical layer device 106 as set forth in IEEE Std 802.3-1995, however, only the data lines 113, transmit enable line 116, and the clock line 119 are shown in FIG. 2 as they are particularly pertinent to the discussion of the present invention.

Turning to FIG. 3, shown is a media access controller 120 in electrical communication with a number of associated physical layer devices 130 according to an embodiment of the present invention. Between the media access controller 120 and the physical layer devices 130 is a common bus 133. The common bus 133 is electrically coupled between the media access controller 120 and each one of the physical layer devices 130. The common bus 133 includes a number of parallel data lines 136, a transmit enable line 139, and a clock line 143. The media access controller 120 further comprises a common bus port 145 that includes a parallel data port 146, an enable port 149, and a clock port 151 that are electrically coupled to the parallel data lines 136, the transmit enable line 139, and the clock line 143, respectively. The electrical coupling may comprise, for example, a pin connection on an integrated circuit, etc., a plug-in connection, or a connection between devices in a single integrated circuit. Thus, the ports 146, 149, and 151 define the points at which electrical signals enter or leave the media access controller 120 to and from the common bus 133. Also, located within the media access controller 120 is transmit logic 153. The transmit logic 153 facilitates the data communication between the media access controller 120 and the individual physical layer devices 130 from the perspective of the media access controller 120.

Figure 4:
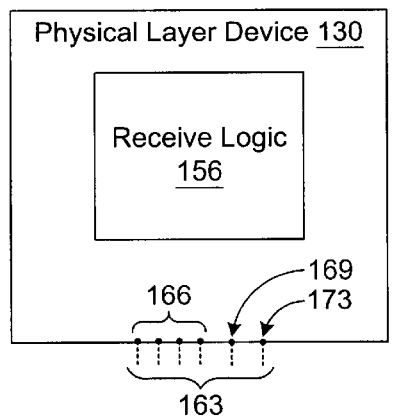
FIG. 4 is a block diagram of a physical layer device communicating with the media access controller of FIG. 3 according to another embodiment of the present invention.

With reference to FIG. 4, shown is a physical layer device 130 according to the present invention. The physical layer device 130 comprises receive logic 156 that facilitates data communication with the media access controller 120. The physical layer device 130 also includes a common bus port 163 that comprises a four bit parallel data port 166, although it is understood that a greater or lesser number of bits may be employed. The common bus port 163 also includes an enable port 169 and a clock port 173. The parallel data port 166, enable port 169, and the clock port 173 are electrically coupled to the parallel data lines 136, enable line 139, and the clock line 143 of the common bus 133. Thus, the ports 166, 169, and 173 define the points at which electrical signals enter or leave the physical layer device 130 to and from the common bus 133.

Also, it is understood that the physical layer device 130 may further comprise output ports and input ports to communicate with physical components other than the media access controller 120, where the physical layer device 130 acts as a link in the chain of a particular data communications path to and from a network (see IEEE Std 802.3-1995) as is known in the art.

Figure 5:
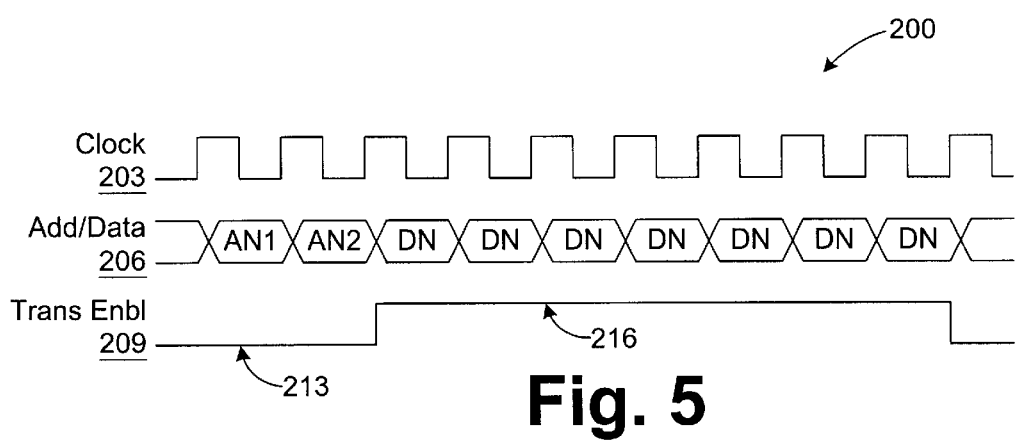
FIG. 5 is a timing diagram of the operation of transmit logic in the media access controller of FIG. 3.

With reference to FIG. 5, shown is a timing diagram 200 that illustrates the signals and data that are transmitted relative to a clock signal by the transmit logic 153 (FIG. 3) onto the common bus 133 (FIG. 3) through the common bus ports 145 (FIG. 3). Specifically, the media access controller 120 transmits data blocks to respective ones of the physical layer devices 130 by first transmitting an address block onto the data lines 136 (FIG. 3) followed by the data block to be transmitted. The address block identifies a particular one of the physical layer devices 130 that is to receive the data block. The physical layer devices 130 receive and process only those data blocks that are preceded by their corresponding address designation. The address blocks and data blocks transmitted by the transmit logic 153 are transmitted in four bit nibbles identified with each cycle of the clock, although a greater or lesser number of bits may be transmitted in parallel.

With this in mind, a description of the timing diagram 200 is provided. The timing diagram includes a clock signal 203 that is generated by a system clock (not shown) and applied to the clock line 143 that routes the clock signal 203 to the media access controller 120 (FIG. 3) and the physical layer devices 130 (FIG. 4). The timing diagram 200 also includes an address/data signal 206 that includes a first address nibble AN 1 and a second address nibble AN2 as well as a number of data nibbles DN. The first and second address nibbles AN1 and AN2 make up the address block as discussed previously. The data nibbles DN make up a data block to be transmitted from the media access controller 120 to a physical layer device 130. The address/data signal 206 is transmitted in parallel across the data lines 136, where each of the address and data nibbles AN1, AN2, and DN are transmitted in a single cycle of the clock signal 203 as shown.

The timing diagram 200 further comprises a transmit enable signal 209 that includes an inactive state 213 (e.g. logical "0") and an active state 216 (e.g. logical "1"). The transmit logic 153 indicates to the receive logic 156 (FIG. 4) within each of the physical layer devices (FIG. 4) whether the current data on the data lines 136 is either an address nibble AN1, AN2 or a data nibble DN by controlling the state of the transmit enable signal 209. When transmitting the address nibbles AN1, AN2, the transmit enable signal 209 is placed in the inactive state 213. When transmitting the data nibbles, the transmit enable signal 209 is placed in the active state 216. In response, the receive logic 156 recognizes the address nibbles AN1, AN2 apart from the data nibbles DN. The receive logic 156 within the physical layer device 130 includes logical circuitry or memory to store and maintain an address designation. Upon receiving the address block from the transmit logic 153, the receive logic 156 compares the address block to its address designation. If a match exists therebetween, the receive logic 156 then receives the data nibbles DN that follow.

In the preceding manner, the media access controllers 120 can transmit a particular data block to any one of the physical layer devices 130 that are coupled to the common bus 133. This is done without the necessity of dedicated pin outputs from the media access controller 120 for each physical layer device 130, thereby resulting in a lower number of output pins from the integrated switch circuit 100 (FIG. 1) that includes the media access controllers 120. Note that since a single address block associated with a particular data block comprises two address nibbles AN1 and AN2, it is possible then that a single media access controller 120 may identify up to 256 total physical layer devices 130 to which to transmit the data block. However, a greater or lesser number of address nibbles AN may be employed to allow a greater or lesser number of physical layer devices 130 to be identified.

Figure 6:
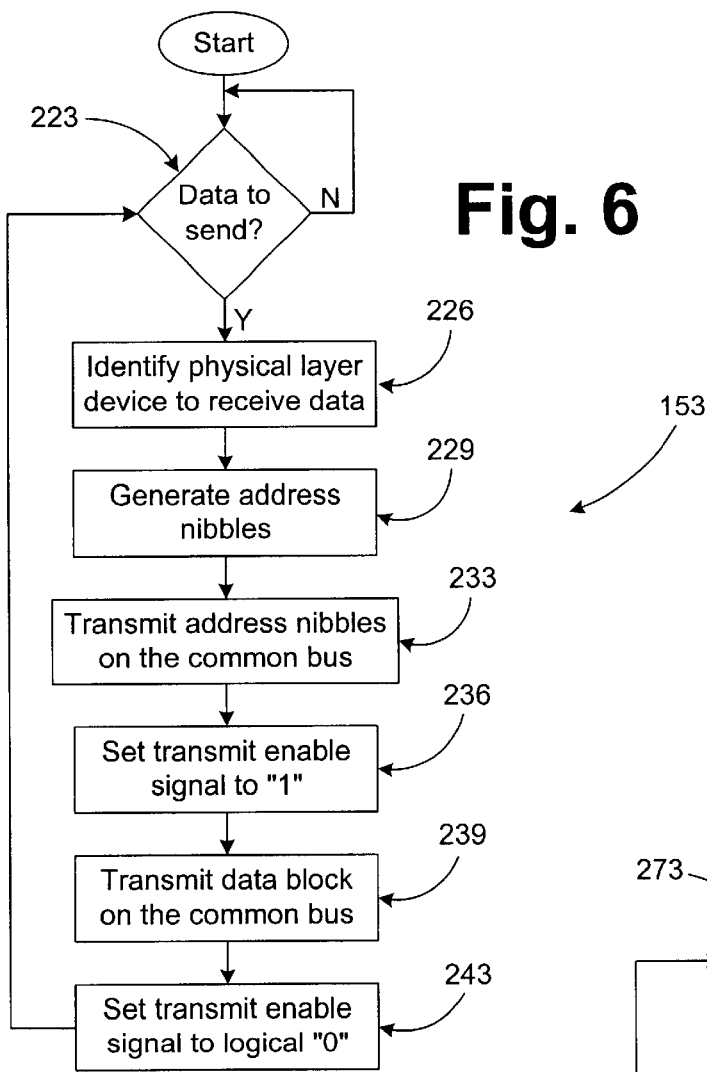
FIG. 6 is a flow chart of transmit logic within the media access controller of FIG. 3.

Turning to FIG. 6, shown is a flow chart of the transmit logic 153 according to an embodiment of the present invention. The transmit logic 153 is preferably implemented with dedicated logical circuitry for speed and efficiency. However, it is also contemplated that the transmit logic 153 may be implemented in terms of software executable by a processor circuit as will be discussed. The transmit logic 153 is executed by the media access controller 120 (FIG. 3) to transmit a particular data block of data nibbles DN (FIG. 5) to one of the physical layer devices 130 (FIG. 4). Beginning with block 223, the transmit logic 152 determines whether there is a data block to transmit to a particular physical layer device 130 (FIG. 3). If not, then the transmit logic 153 waits. If so, then the transmit logic 153 moves on to block 226 in which the particular physical layer device 130 is identified that is to receive the data block. In particular, this identification may involve looking up an address designation for the particular physical layer device 130 among a number of possible address designations maintained in the media access device 130 using appropriate logical circuitry.

Thereafter, in block 229 the transmit logic 153 generates the first and second address nibbles AN1 and AN2 associated with the identified physical layer device 130. Then in block 233, the address nibbles AN1 and AN2 are transmitted on the data lines of the common bus 133 (FIG. 3) while the transmit enable signal 209 (FIG. 5) is maintained in the inactive state 213 (FIG. 5). The transmit logic 153 then moves on to block 236 in which the transmit enable signal 209 is set to the active state. In block 239 the data nibbles DN (FIG. 5) that make up the data block are transmitted to the physical layer devices 120 in synchronicity with the clock cycles of the clock signal 203 (FIG. 5). Finally, in block 243 the transmit enable signal 209 is set to the inactive state 213 once the last data nibble DN of the data block has been transmitted. Thereafter, the transmit logic 153 reverts back to block 223 to await the transmission of the next data block.

Figure 7:
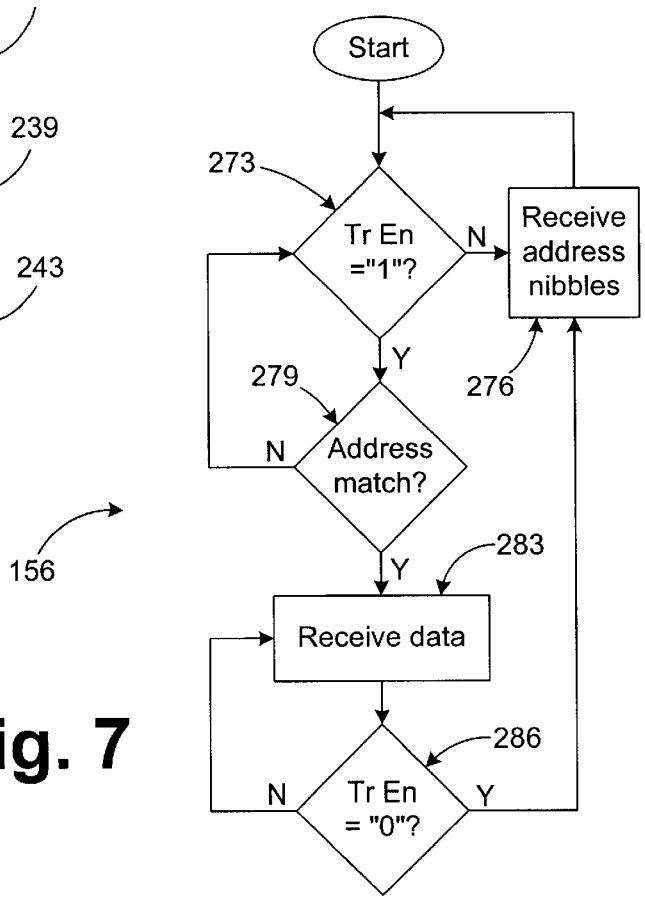
FIG. 7 is a flow chart of receive logic within the physical layer device of FIG. 4.

Turning to FIG. 7, shown is a flow chart of the receive logic 156 according to an embodiment of the present invention. The receive logic 156 is preferably implemented with dedicated logical circuitry for speed and efficiency. However, it is also contemplated that the receive logic 156 may be implemented in terms of software executable by a processor circuit as will be discussed. The receive logic 156 is executed by the physical layer device 130 (FIG. 4) to receive a data block of data nibbles DN (FIG. 5) from the media access controller 120 (FIG. 3). Beginning with block 273, the receive logic 156 determines if the transmit enable signal 209 (FIG. 5) received from the media access controller 120 (FIG. 3) via the enable line 139 (FIG. 3) is in the active state 216 (FIG. 5). If not, then the receive logic 156 progresses to block 276 in which the receive logic 156 enters into a state to receive the address nibbles AN1, AN2 (FIG. 5). On the other hand, if the transmit enable signal 209 (FIG. 5) is in the active state 216 in block 273, the receive logic 156 moves to block 279.

In block 279, the receive logic 156 determines whether the address block received in the form of the address nibbles AN1, AN2 in block 276 is equal to the address designation assigned to the physical layer device 130. If so, then the receive logic 156 progresses to block 283 in which receive logic 156 enters a state in which the data nibbles DN (FIG. 5) are received from the media access controller 120 via the data lines 136 (FIG. 3). If not, then the receive logic 156 reverts back to block 273.

The receive logic 156 then moves to block 286 in which it is determined whether the transmit enable signal 209 is in the inactive state 216 (FIG. 5). If so then the receive logic 156 moves to block 276 in which the receive logic 156 enters into the state to receive the address nibbles AN1, AN2 (FIG. 5). Otherwise, the receive logic 156 reverts to block 283 in which the receive logic 156 continues to receive the data nibbles DN.

Referring back to FIG. 3, the present invention also includes a separate common bus in addition to the common bus 133 to facilitate data communication from each one of the physical layer devices 130 to the media access controller 130. The common bus employed for communication as such is substantially similar to the common bus 133. In this regard, each physical layer device 130 transmits a data block in the form of data nibbles to the media access controller 120. Since there is only one destination on the common bus, i.e. the media access controller 120, then there is no need to employ addressing in the reverse path. However, a scheme is employed in each of the physical layer devices to avoid data collision between the individual physical layer devices in transmitting data to the media access controller 130.

In addition, the present invention generally applies to any interface between a media access controller of the data link layer and a physical layer device of the physical layer. In this regard, the present invention applies without limitation to any media access controller and physical layer device regardless of attributes such as bit rate or other characteristics.

Figure 8:
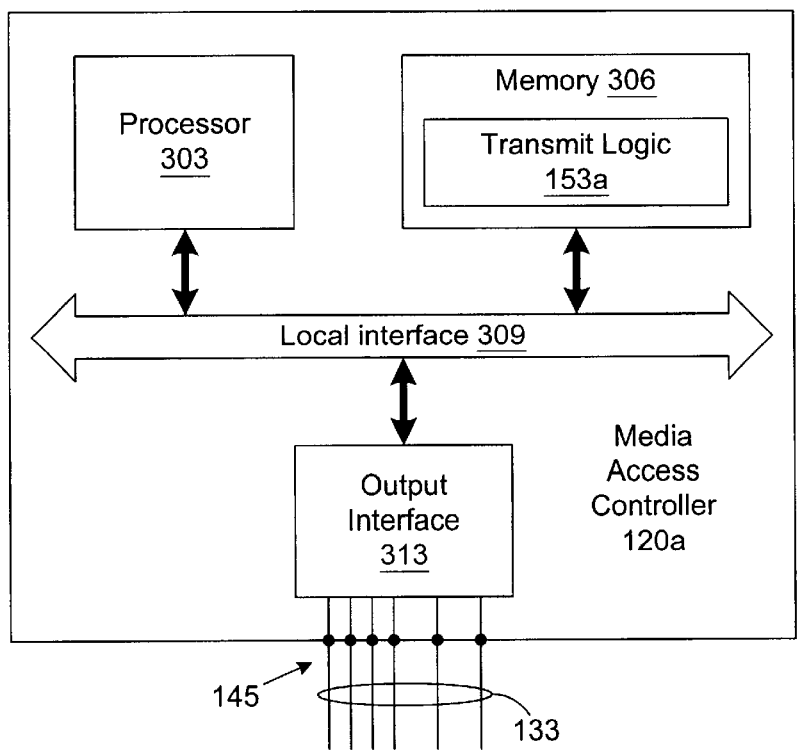
FIG. 8 is a block diagram of a media access controller that includes a software implementation of the transmit logic of FIG. 6.

With reference to FIG. 8, shown is a media access controller 120a according to another embodiment of the present invention that illustrates a software implementation of the transmit logic 153 (FIG. 6), denoted transmit logic 153a. The media access controller 120a includes a processor 303 and a memory 306, both of which are coupled to a local interface 309. The local interface may comprise, for example, a data bus with an accompanying control bus, etc. The media access controller 120a further includes an output interface 313 that provides a link between the local interface 309 and the common bus 133. The output interface 313 includes a common bus port 145 as discussed with respect to the media access controller 120 (FIG. 3). In the case of the media access controller 120a, the transmit logic 153a is stored on the memory 306 and is executable by the processor 303. The processor 303 need not be dedicated to execute the transmit logic 153a, where the transmit logic 153a may be implemented in conjunction with other logic or applications that are stored in the memory 306. Note that the media access controller 120a stores the address designations of all the physical layer devices 130 (FIG. 3) so that a proper address block may be generated by the transmit logic 153a to send a data block to a particular physical layer device 130.

Figure 9:
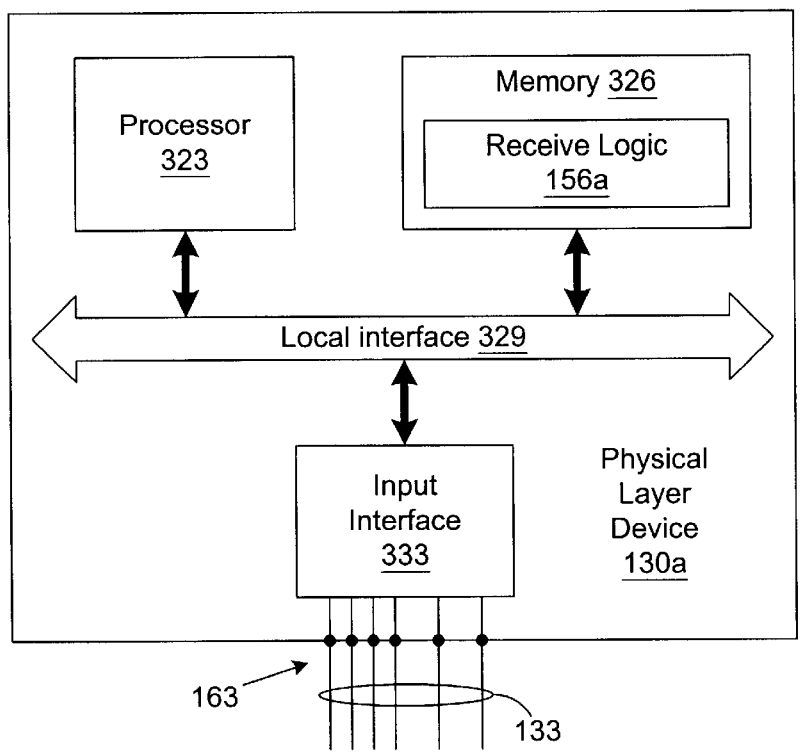
FIG. 9 is a block diagram of a media access controller that includes a software implementation of the receive logic of FIG. 7.

With reference to FIG. 9, shown is a physical layer device 130a according to another embodiment of the present invention that illustrates a software implementation of the receive logic 156 (FIG. 7), denoted receive logic 156a. The physical layer device 130a includes a processor 323 and a memory 326, both of which are coupled to a local interface 329. The local interface 329 may comprise, for example, a data bus with an accompanying control bus, etc. The physical layer device 130a further includes an input interface 333 that provides a link between the local interface 329 and the common bus 133. The input interface 333 includes a common bus port 163 as discussed with respect to the physical layer device 130 (FIG. 4). In the case of the physical layer device 130a, the transmit logic 156a is stored on the memory 326 and is executable by the processor 323. The processor 323 need not be dedicated to execute the receive logic 156a, where the receive logic 156a may be implemented in conjunction with other logic or applications that are stored in the memory 326.

The memories 306 and 326 include both volatile and nonvolatile memory components. Volatile components are those that do not retain data values upon loss of power. Conversely, nonvolatile components retain data upon a loss of power. Thus, the memories 306 and 326 may comprise, for example, random access memory (RAM), read-only memory (ROM), hard disk drives, floppy disk drives, compact disk drives, tape drives, and/or other memory components, or a combination of any two or more of these memory components.

If embodied in hardware, the transmit and receive logic 153 and 156 can be implemented as a circuit or state machine that employs any one or a combination of technologies, including but not limited to, discrete logic circuits having logic gates for implementing various logic functions upon an application of one or more data signals, an application specific integrated circuit having appropriate logic gates, a programmable gate array(s) (PGA), a field programmable gate array (FPGA), or other components, etc. Such technologies are generally well known by those skilled in the art and, consequently, are not described in detail herein.

The flow charts of FIGS. 6 and 7 show the architecture, functionality, and operation of an implementation of the logic 153 (FIG. 6) and 156 (FIG. 7). If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. It is understood that all such variations are within the scope of the present invention.

Also, transmit and receive logic 153 and 156 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable readable medium would include, but are not limited to, the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system in a media access controller for communicating to a number of physical layer devices, comprising:
   a common bus port for electrical coupling to a common bus that is electrically coupled to the physical layer devices, the common bus port including a parallel data port and an enable port; and
   a logical circuit to selectively transmit a data block to a respective one of the physical layer devices from the parallel data port.

2. The system of claim 1, wherein the logical circuit to selectively transmit a data block to a predetermined physical layer device from the parallel data port further comprises:
   a logical circuit to generate an address block indicating a respective one of the physical layer devices to receive the data block; and a logical circuit to transmit the address block from the parallel data port.

3. The system of claim 1, further comprising a logical circuit to transmit a transmit enable signal from the enable port that indicates a transmission of the data block via the parallel data port.

4. The system of claim 2, wherein the address block further comprises at least one nibble of data.

5. The system of claim 2, wherein the logical circuit to transmit the address block from the parallel data port further comprises a logical circuit to transmit the address block before the data block.

6. A system in a media access controller for communicating to a number of physical layer devices, comprising:
   a processor coupled to a local interface;
   a memory coupled to a local interface;
   a common bus port coupled to the local interface, the common bus port being adapted for electrical coupling to a common bus that is electrically coupled to the number of physical layer devices, the common bus port including a parallel data port and an enable port; and
   operating logic stored on the memory and executable by the processor, the operating logic further comprising logic to selectively transmit a data block to a respective one of the physical layer devices from the parallel data port.

7. The system of claim 6, wherein the operating logic further comprises:
   logic to generate an address block indicating a respective one of the physical layer devices to receive the data block; and
   logic to transmit the address block from the parallel data port.

8. The system of claim 6, wherein the operating logic further comprises logic to transmit a transmit enable signal from the enable port that indicates a transmission of the data block from the parallel data port.

9. The system of claim 7, wherein the address block further comprises at least one nibble of data.

10. The system of claim 7, wherein the logic to transmit the address block via the parallel data port further comprising logic to transmit the address block before the data block.

11. A system in a media access controller for communicating to a number of physical layer devices, comprising:
   a common bus port for electrical coupling to a common bus that is electrically coupled to the number of physical layer devices, the common bus port including a parallel data port and an enable port; and
   means for selectively transmitting a data block to a respective one of the physical layer devices from the common bus port.

12. The system of claim 11, wherein the means for transmitting a data block to a predetermined physical layer device via the common bus port further comprises:
   means for generating an address block indicating a respective one of the physical layer devices to receive the data block; and
   means for transmitting the address block via the common bus port.

13. The system of claim 11, further comprising means for transmitting a transmit enable signal via the enable port that indicates a transmission of the data block via the common bus port.

14. A method for communicating to a number of physical layer devices via a media access controller, comprising the steps of:
   providing a common bus port in the media access controller for electrical coupling to a common bus that is electrically coupled to the number of physical layer devices, the common bus port including a parallel data port and an enable port; and
   transmitting a data block to a respective one of the physical layer devices from the parallel data port.

15. The method of claim 11, wherein the step of transmitting a data block to a predetermined physical layer device from the parallel data port further comprises the steps of:
   generating an address block in the media access controller indicating a respective one of the physical layer devices to receive the data block; and
   transmitting the address block from the media access controller to the respective one of the physical layer devices from the parallel data port.

16. A system in a physical layer device to receive data from a media access controller, comprising:
   a common bus port for electrical coupling to a common bus that is electrically coupled to a number of physical layer devices, the common bus port comprising a parallel data port and an enable port;
   a logical circuit to maintain an address designation associated with the physical layer device;
   a logical circuit to receive an address block via the parallel data port; and
   a logical circuit to receive a data block associated with the address block via the parallel data port.

17. The system of claim 16, further comprising a logical circuit to receive a transmit enable signal via the enable port that indicates a transmission of the data block.

18. The system of claim 16, further comprising a logical circuit to compare the address block with the address designation to determine an existence of a match therebetween.

19. The system of claim 18, wherein the logical circuit to receive the data block associated with the address block via the parallel data port further comprises a logical circuit to receive the data block upon an existence of the match between the address block and the address designation.

20. A system in a physical layer device to receive data from a media access controller, comprising:
   a processor coupled to a local interface;
   a memory coupled to the local interface;
   a common bus port coupled to the local interface, the common bus port being adapted for electrical coupling to a common bus that is electrically coupled to a number of physical layer devices, the common bus port comprising a parallel data port and an enable port; and
   operating logic stored on the memory and executable by the processor, the operating logic further comprising:
   logic to maintain an address designation associated with the physical layer device;
   logic to receive an address block via the parallel data port; and logic to receive a data block associated with the address block via the parallel data port.

21. The system of claim 20, wherein the operating logic further comprises logic to receive a transmit enable signal via the enable port that indicates a transmission of the data block.

22. The system of claim 20, wherein the operating logic further comprises logic to compare the address block with the address designation to determine an existence of a match therebetween.

23. The system of claim 22, wherein the logic to receive a data block associated with the address block via the parallel data port further comprises logic to receive the data block upon an existence of the match between the address block and the address designation.

24. A system in a physical layer device to receive data from a media access controller, comprising:
- a common bus port adapted for electrical coupling to a common bus that is electrically coupled to a number of physical layer devices, the common bus port comprising a parallel data port and an enable port;
- means for maintaining an address designation associated with the physical layer device;
- means for receiving an address block via the parallel data port; and
- means for receiving a data block associated with the address block via the parallel data port.

25. The system of claim 24, further comprising means for receiving a transmit enable signal via the enable port that indicates a transmission of the data block.

26. The system of claim 24, further comprising means for comparing the address block with the address designation to determine an existence of a match therebetween.

27. The system of claim 26, wherein the means for receiving a data block associated with the address block via the parallel data port further comprises means for receiving the data block upon an existence of the match between the address block and the address designation.

28. A method to receive data in a physical layer device from a media access controller, comprising the steps of:
- providing for a common bus port in the physical layer device, the common bus port being adapted for electrical coupling to a common bus that is electrically coupled to a number of physical layer devices, the common bus port comprising a parallel data port and an enable port;
- maintaining an address designation associated with the physical layer device;
- receiving an address block from the media access controller via the parallel data port; and
- receiving a data block associated with the address block from the media access controller via the parallel data port.

29. The method of claim 28, further comprising the step of receiving a transmit enable signal from the media access controller via the enable port that indicates a transmission of the data block.

30. The method of claim 28, further comprising the step of comparing the address block with the address designation to determine an existence of a match therebetween.

* * * * *